US010452094B2

(12) United States Patent
Ullein et al.

(10) Patent No.: US 10,452,094 B2
(45) Date of Patent: Oct. 22, 2019

(54) TENSIONING DEVICE HAVING A TRANSPORT SECURING CONCEPT

(71) Applicant: Schaeffler Technologies AG & Co. KG, Herzogenaurach (DE)

(72) Inventors: Thomas Ullein, Herzogenaurach (DE); Matthias Goeb, Ebelsbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 132 days.

(21) Appl. No.: 15/507,558

(22) PCT Filed: Jun. 1, 2015

(86) PCT No.: PCT/DE2015/200326
§ 371 (c)(1),
(2) Date: Feb. 28, 2017

(87) PCT Pub. No.: WO2016/037615
PCT Pub. Date: Mar. 17, 2016

(65) Prior Publication Data
US 2017/0255222 A1    Sep. 7, 2017

(30) Foreign Application Priority Data

Sep. 8, 2014 (DE) .................. 10 2014 217 891

(51) Int. Cl.
G05G 5/06 (2006.01)
F16H 7/08 (2006.01)
F16H 57/00 (2012.01)

(52) U.S. Cl.
CPC ................ *G05G 5/06* (2013.01); *F16H 7/08* (2013.01); *F16H 2007/0806* (2013.01);
(Continued)

(58) Field of Classification Search
CPC ............... F16H 2007/0878; F16H 7/08; F16H 2007/0806; F16H 2007/0853; F16H 7/0848
(Continued)

(56) References Cited

U.S. PATENT DOCUMENTS 4,934,984 A * 6/1990 Ojima .................. F16H 7/08
474/111
5,033,992 A * 7/1991 Ojima .................. F16H 7/08
474/111
(Continued)

FOREIGN PATENT DOCUMENTS

CN       1656328     8/2005
CN     102227275    10/2011
(Continued)

OTHER PUBLICATIONS

International Search Report of PCT/DE2015/200326 dated Oct. 5, 2015, 2 pages.

*Primary Examiner* — Henry Y Liu
(74) *Attorney, Agent, or Firm* — Davidson, Davidson & Kappel, LLC

(57) ABSTRACT

A tensioning device (1) for tensioning a traction mechanism of a traction mechanism drive, including a housing (2), a piston (3) that is mounted such that the piston can be displaced in an axial direction inside the housing (2), and a transport securing element (4), which in at least one transport position of the tensioning device (1) is arranged in the housing (2) transversely to the piston (3) and in abutment with the piston (3) such that a displacement of the piston (3) in at least one first axial direction is blocked. The transport securing element (4) is provided with a support portion (5), wherein in the transport position at least one first web area (6) of the support portion (5) is in abutment with one end face (7) of the piston (3), and an additional web area (8) of
(Continued)

the support portion (5) extending in an axial direction away from the first web area (6) is supported in the housing (2), at least in a radial direction.

12 Claims, 2 Drawing Sheets

(52) U.S. Cl.
CPC ............ *F16H 2007/0812* (2013.01); *F16H 2007/0859* (2013.01); *F16H 2007/0878* (2013.01); *F16H 2007/0891* (2013.01); *F16H 2057/0093* (2013.01)

(58) Field of Classification Search
USPC .......................................... 474/110
See application file for complete search history.

(56) References Cited

U.S. PATENT DOCUMENTS

| | | | | |
|---|---|---|---|---|
| 5,106,344 A * | 4/1992 | Ojima | ............... | F16H 7/08 474/117 |
| 6,435,992 B2 * | 8/2002 | Wakabayashi | ............ | F16H 7/08 474/101 |
| 6,695,730 B2 * | 2/2004 | Amano | ............... | F16H 7/08 474/101 |
| 6,916,264 B2 * | 7/2005 | Hashimoto | ............ | F16H 7/0848 474/109 |
| 7,063,634 B2 * | 6/2006 | Hashimoto | ............ | F16H 7/0848 474/110 |
| 7,527,572 B2 * | 5/2009 | Sato | ............... | F16H 7/0836 24/616 |
| 8,257,212 B2 * | 9/2012 | Yoshimura | ............ | F16H 7/0836 474/101 |
| 8,690,717 B2 * | 4/2014 | Fuhrmann | ............... | F16H 7/08 474/109 |
| 8,888,624 B2 * | 11/2014 | Bauer | ............... | F16H 7/08 474/110 |
| 2003/0017893 A1 * | 1/2003 | Kaido | ............... | F16H 7/08 474/101 |
| 2003/0125142 A1 * | 7/2003 | Hashimoto | ............ | F16H 7/0848 474/109 |
| 2006/0046882 A1 * | 3/2006 | Assel | ............... | F16H 7/08 474/111 |
| 2010/0222167 A1 * | 9/2010 | Chekansky | ............ | F16H 7/0836 474/110 |
| 2011/0230288 A1 * | 9/2011 | Schulz | ............... | F16H 7/0848 474/110 |

FOREIGN PATENT DOCUMENTS

| | | |
|---|---|---|
| CN | 102282391 | 12/2011 |
| DE | 3928762 | 3/1990 |
| DE | 19828534 | 12/1999 |
| DE | 10 2004 041 975 A1 | 3/2001 |
| DE | 10059755 | 12/2001 |
| DE | 102008011365 | 9/2009 |
| GB | 2356911 | 6/2001 |
| WO | WO02013182233 | 12/2013 |

\* cited by examiner

TENSIONING DEVICE HAVING A TRANSPORT SECURING CONCEPT

The present invention relates to a tensioning device, which is preferably designed as a belt or chain tensioner, for tensioning a traction mechanism (belt or chain) of a traction mechanism drive (chain drive or belt drive) of a motor vehicle, such as a passenger car, a truck, a bus or an agricultural utility vehicle, including a housing, a piston mounted in the housing, displaceable in the axial direction, and a transport securing element, which, in at least one transport position of the tensioning device, is situated transversely to the piston and in abutment with the piston in the housing in such a way that a displacement of the piston in at least one first axial direction (out of the housing) is blocked.

BACKGROUND

Generic tensioning devices are already known from the prior art. For example, DE 10 2004 041 975 A1 discloses a tensioning device for a traction mechanism drive, which includes a securing element and may be blocked thereby, the securing element being automatically deactivatable by mounting the tensioning device on a motor or by mounting another component.

In this embodiment, once the tensioning device is fixedly mounted on an internal combustion engine, for example on an engine block, the transport securing element is simultaneously released. An unintentional displacement of the piston relative to the housing may nevertheless occur thereby as long as the traction mechanism to be tensioned has not yet been completely mounted and is pressed against the piston. Above all, the transport securing elements are to be connected to the housing in a complex manner to reliably allow the transport securing element to remain in the housing even during the operation of the tensioning device and to prevent this part from falling out. The disclosed transport securing elements are furthermore to be manufactured as relatively complex parts.

SUMMARY OF THE INVENTION

It is an object of the present invention to provide a transport securing element which permanently and reliably secures the piston relative to the housing, a separate reworking of the piston for accommodating the transport securing element being intended to be avoided.

The present invention provides that the transport security element includes a supporting section, at least one first web area of the supporting section being in abutment with an end face of the piston in the transport position, and another web area (hereinafter referred to as the second web area) of the supporting section, which extends away from the first web area essentially in the axial direction (i.e. which, in a cross sectional view of the supporting section, extends transversely/obliquely to the first web area running in the radial direction), being supported in the housing at least in the radial direction.

A transport securing element is provided thereby, which secures the piston particularly smoothly along the circumference. Separate receiving grooves for the transport securing element in the piston may be avoided, whereby a much more cost-effective manufacture is possible. In particular, the transport securing element may be particularly cost-effectively designed.

Other advantageous specific embodiments are explained in greater detail below.

It is also advantageous if the transport securing element is designed as a pin-shaped component, preferably extending essentially in a straight manner, and/or if the second web area is longer or shorter than the first web area (in the transport position), viewed in the axial direction of the piston. The manufacturing complexity of the transport securing element is further reduced thereby.

It is also advantageous if the transport securing element has an L-shaped, preferably a double L-shaped, more preferably an S-shaped or even more preferably a Z-shaped cross section, at least in the area of the supporting section, the first web area, viewed in cross section, being designed as a first leg of the cross section and the second web area being designed as a second leg of the cross section, and/or if at least another third web area of the supporting section is designed as a third leg of the cross section. The third web area, in turn, is preferably used for axial support in the housing. Other web areas may also be formed, depending on the cross sectional shape. Cross sections are implemented thereby, which form a stable support, in particular in the radial direction.

If an inner side of the first web area abuts the end face of the piston in the transport position, the supporting section may be situated in the housing in a particularly space-saving manner. The installation space for accommodating the transport securing element is further reduced thereby.

In this connection, it is furthermore advantageous if an outer side of the first web area facing away from the inner side of the first web area abuts a hook-shaped projection of the housing in the transport position. The transport securing element is thus sufficiently and securely supported.

If an inner side of the second web area, in turn, is situated to face an outer shell side of the piston in the transport position, the L-shaped structure may furthermore be situated in a space-saving manner. This inner side of the second web area is preferably also used as a stop surface for the outer shell side, for the purpose of restricting the radial mobility of the piston. However, it is furthermore possible to situate this inner side at a distance from the outer shell side for the purpose of providing the piston with a certain clearance during transport. The piston is also safely guided thereby in the radial direction.

It is also advantageous if an outer side of the second web area facing away from the inner side of the second web area is supported on the housing in the radial direction in the transport position. The position of the transport securing element is also secured thereby in the radial direction. This outer side of the web area particularly preferably abuts an inner circumferential side of the hook-shaped projection of the housing. As a result, the housing may be provided with a particularly compact design.

If the second web area of the transport securing element is positioned in a recess of the housing in the transport position, the transport securing element may be integrated in a particularly compact manner in the transport position.

Moreover, it is also advantageous if the transport securing element is manufactured from a metal material or from a plastic material to further lower the manufacturing costs of the transport securing element.

If the transport securing element s furthermore manufactured from a profiled wire, a reworking operation following the primary forming of the raw material of the transport securing element is preferably simplified.

It is also advantageous if the two web areas of the transport securing element are situated to run essentially perpendicular to each other, viewed in cross section. As a result, the transport securing element has a further space-saving design.

In other words, the use of a profiled transport securing pin (transport securing element) is implemented by the inventive approach. This transport securing pin abuts the piston outer diameter (outer shell side) and the end surface/end face, and thus does not require a special contour of the piston. Another advantage is that the "smooth" piston used may be employed universally in different applications, and the variant variety is thus reduced. The transport securing pin may be cost-effectively formed from a profiled wire or designed as a plastic molded part.

BRIEF DESCRIPTION OF THE DRAWINGS

The present invention is now explained in greater detail below on the basis of figures, in which connection different specific embodiments are illustrated.

DETAILED DESCRIPTION

Figure 1:
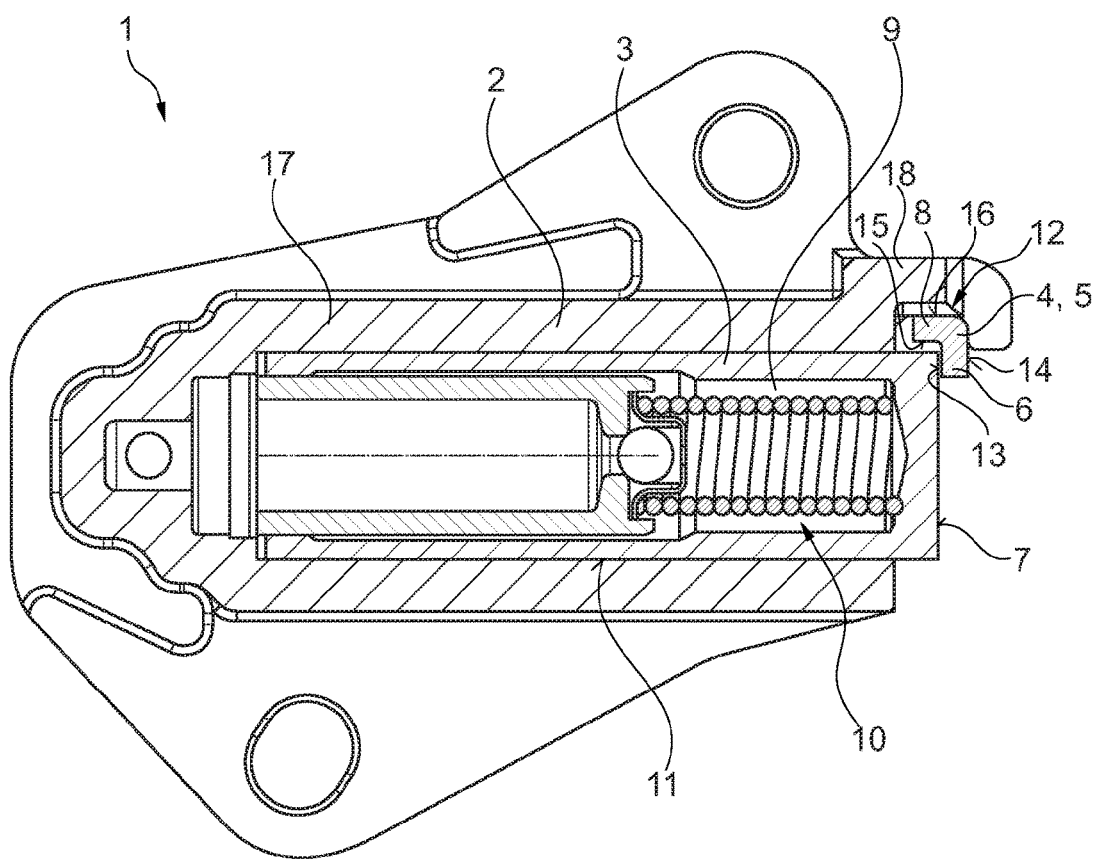
FIG. 1 shows a longitudinal sectional representation of a tensioning device according to the present invention according to a first specific embodiment, the tensioning device being shown in the transport position, and the transport element supporting the piston relative to the housing in a first axial direction being cut in an L-shaped supporting section, viewed in cross section.

The figures are only of a schematic nature and are used exclusively for the sake of understanding the present invention. Identical elements are provided with the same reference numerals.

Tensioning device 1 according to the present invention is clearly illustrated in FIG. 1 in the form of a chain tensioner. In another specific embodiment, tensioning device 1 is designed as a belt tensioner. Tensioning device 1 is used in an operating state of an internal combustion engine, for example a gasoline engine or a diesel engine of a motor vehicle, such as a passenger car, a truck, a bus or an agricultural utility vehicle, for tensioning a traction mechanism, a chain in this case (further preferably a belt) of the traction mechanism drive (chain drive, further preferably a belt drive).

Tensioning device 1 furthermore includes a housing 2, which is open in the direction of an axial side. Within this housing 2, in a cylindrically extending housing area (hereinafter referred to as base section 17), a piston 3 is displaceably supported in the axial direction relative to housing 2. Tensioning device 1 is designed as a hydraulic tensioning device 1. Consequently, piston 3 is displaceably supported in both a spring-elastically and damped manner in housing 2 with the aid of a hydraulic pressure chamber 9 and a spring device 10. Tensioning device 1 functions, in principle, like the one disclosed in DE 10 2004 041975 A1, this disclosure being therefore regarded as integrated herein.

Tensioning device 1 is furthermore provided with a transport securing element 4, namely in a transport position of tensioning device 1 (transport position is that position in which tensioning device 1 is placed after assembly for the end customer for final mounting on the internal combustion engine). In this transport position, transport securing element 4 is used in tensioning device 1 in such a way that it is inserted into housing 2/situated/supported/held in housing 2 transversely to piston 3, i.e., transversely with respect to the longitudinal axis of piston 3, as well as in abutment with piston 3. Tensioning device 1 is inserted into housing 2 from the outside in such a way that a displacement of piston 3 in at least one first axial direction, namely out of housing 2, is blocked. To remove transport securing element 4 in a state mounted on the internal combustion engine side, an end of transport securing element 4 (which is not further illustrated for the sake of clarity) is provided, which extends outwardly into the surroundings of housing 2. As a result, transport securing element 4 may be easily removed after mounting has taken place.

Transport securing element 4 includes a supporting section 5 having an L-shaped cross section, at least one first web area 6 (also referred to as first leg area/leg) of supporting section 5 being pressed against/abutting end face 7 (also referred to as end surface) of piston 3 in this transport position illustrated in FIG. 1. Another, namely second, web area 8 (also referred to as second leg area/leg) of supporting section 5, is supported in housing 2 in the radial direction, this second web area 8 extending away from first web area 6 in the axial direction of piston 3 (viewed in the transport position).

Piston 3 is held on its end face 7 in the transport position by transport securing element 4, this end face 7 facing out of opening housing 2. Piston 3, which is designed as a hollow piston, has an essentially smooth, cylindrical outer side/outer shell side 11, which extends continuously along the axial extension of piston 3 with a uniform diameter. This outer side 11 may, however, have taperings/uneven areas/shoulders or recesses (for example, milled areas). Transport securing element 4 extends with second web area 8 into an angular/rectangular recess 12, which is formed on/in housing 2, on the one hand, and extends with first web area 6 inwardly in the radial direction (toward the piston center) out of this recess 12, on the other hand, so that a radial inner area of first web area 6 directly abuts end face 7 of piston 3 in the transport position.

Viewed in the axial direction, each of web areas 6, 8 has an inner side and an outer side. According to the location in the transport position of tensioning device 1, first web area 6 has an (axial) inner side, hereinafter referred to as first inner side 13, and an (axial) outer side facing away from this first inner side, hereinafter referred to as first outer side 14. First outer side 14 faces away from first inner side 13. First outer side 14 thus forms that axial side of first web area 6 which faces piston 3 in the transport position, namely in contact therewith. First outer side 14, in turn, is that axial side of first web area 6 which faces away from piston 3 or its end face 7 and is supported on/pressed against housing 2 in the axial direction (due to the piston pretensioning out of housing 2). Second web area 8 also has an inner side and an outer side, the inner side, hereinafter referred to as second inner side 15, represents a radial inner side. A (radial) outer side of second web area 8, hereinafter referred to as second outer side 16, is situated radially outside second inner side 15, namely facing away therefrom. Second inner side 15 is consequently the side of second web area 8 which faces outer shell side 11 of piston 3 in the transport position. Second outer side 16 is that side of second web area 8 which faces away from outer shell side 11 and is supported on housing 2 in the radial direction in the area of recess 12.

Transport securing element 4 is manufactured as a profiled band/wire element, which is manufactured from a steel band. Alternatively, however, it is also possible to manufacture transport securing element 4 from a plastic material, for example from a plastic molded part.

Transport securing element 4 is essentially designed as a straight, profiled pin, whereby recess 12 is consequently also designed as a recess essentially extending in a straight manner (in the form of a through-hole or blind hole). Transport pin/transport securing element 4 is positioned/situated along a circumferential plane of piston 3 in the transport position.

In closer examination, recess 12 is furthermore formed by a hook-shaped projection 18 extending in the axial direction away from an essentially circular base section 17 of housing 2. Projection 18 has recess 12 designed as a longitudinal groove on an inner side facing piston 3. On a side facing away from base section 17, projection 18 extends inwardly again in the radial direction to the extent that first outer side 14 of first web area 6 is directly supported by projection 18. The two web areas 6 and 8 extend along supporting section 5, pitched at an essentially 90° angle with respect to each other.

Figure 2:
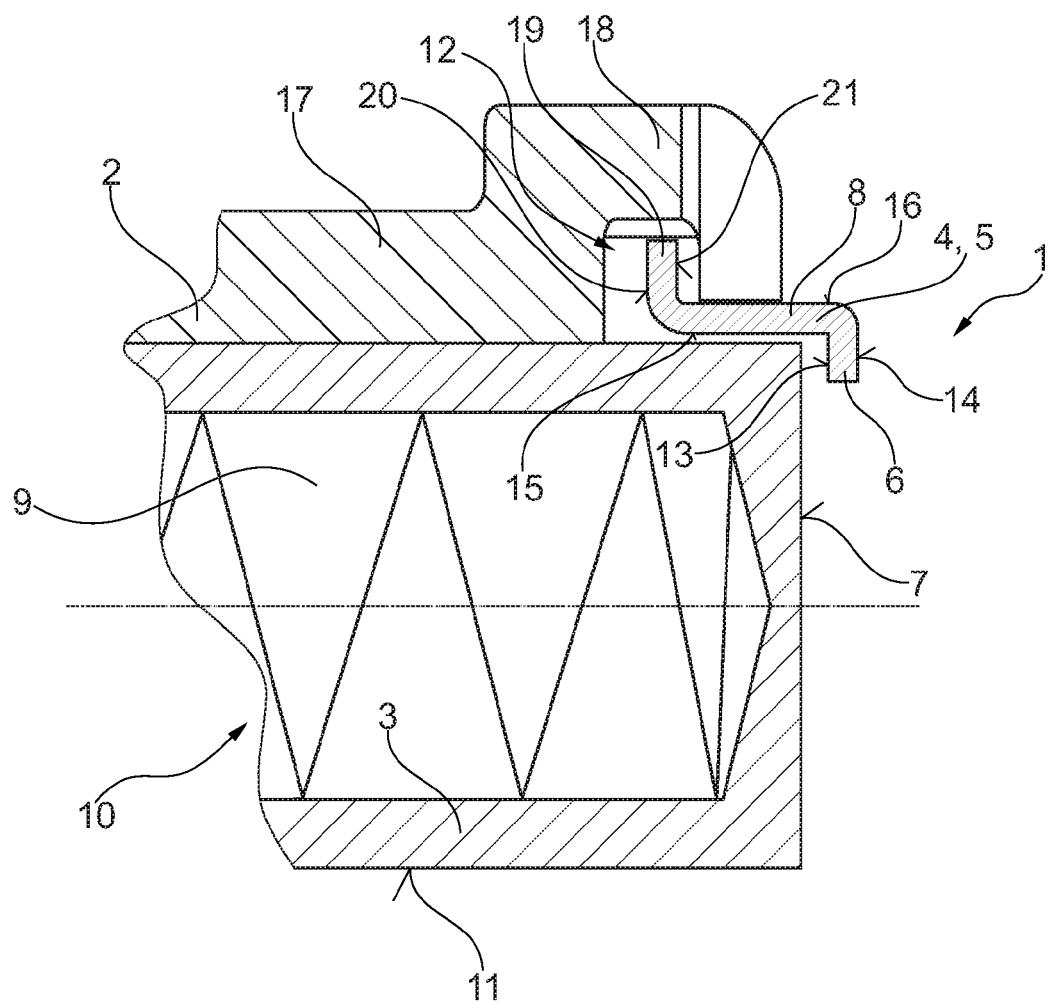
FIG. 2 shows a longitudinal sectional representation of a tensioning device according to the present invention according to a second specific embodiment, which is essentially designed according to the first specific embodiment, the supporting section of the transport securing element now having a double L-shape design, viewed in cross section.

Another, second specific embodiment of tensioning device 1 according to the present invention is illustrated in FIG. 2, this second specific embodiment being designed and functioning according to the first specific embodiment, and only the differences are discussed below for the sake of brevity. In the second specific embodiment, transport securing element 4 is formed with a double-L shape in the area of supporting section 5. First web area 6 is again that area of supporting section 5 which extends in the radial direction (viewed in cross section). First inner side 13 is again in contact with end face 7 of piston 3. Since first web area 6 is furthermore situated outside recess 12, i.e. outside housing 2, first outer side 14 is also situated outside recess 12 and is not in contact with housing 2/projection 18.

Second web area 8 is again the area of supporting section 5 which extends essentially in the axial direction of piston 3 (i.e. perpendicularly to first web area 6) in the transport direction (viewed in cross section). Second web area 8 extends in the axial direction from first web area 6 into housing 2 to such an extent that second web area 8, in turn, extends into recess 12 and is supported directly on housing 2 with second outer side 16 in the radial direction in the area of recess 12.

Second web area 8 is also (indirectly) held in housing 2 in the axial direction. For this purpose, second web area 8 of transport securing element 4 has a third web area 19 extending outwardly in the radial direction on an axial end facing away from first web area 6 (viewed in cross section). Third web area 19, in turn, forms a first axial end surface (referred to as third outer side 21), which points in the same direction as end face 7 and has a second end surface (referred to as third inner side 20) facing away from first axial end surface. Transport securing element 4 is then, in turn, supported with third outer side 21 on housing 2 in the extension direction of piston 3. Third web area 19 extends perpendicularly away from second web area 8, radially to the outside, and runs in parallel to first web area 6. Transport securing element 4 is thus supported with third outer side 21 on housing 2 in the radial direction, optionally or simultaneously with respect to the second outer side. Third web area 19 is also used as a radial or axial contact surface on housing 2/projection 18 in addition to second web area 8 or instead of second web area 8.

Another advantage of the specific embodiment according to FIG. 2 is that the transport securing system is implemented even when piston 3 projects out of housing 2 (extending out of housing 2 by a certain distance in the transport position). Housing 2 may thus be provided with a compact design relatively independently with respect to piston 3. Due to projecting piston 3, functional components are also protected against colliding with housing 2.

In other specific embodiments, it is also possible to provide supporting section 5 of transport securing element 4 with S-shaped, Z-shaped or other advantageous cross-sectional designs instead of the cross-sectional L-shaped or double L-shaped design.

LIST OF REFERENCE NUMERALS 1 tensioning device
2 housing
3 piston
4 transport securing element
5 supporting section
6 first web area
7 end face
8 second web area
9 pressure chamber
10 spring device
11 outer shell side
12 recess
13 first inner side
14 first outer side
15 second inner side
16 second outer side
17 base section
18 projection
19 third web area
20 third inner side
21 third outer side

What is claimed is:

1. A tensioning device for tensioning a traction mechanism of a traction mechanism drive, the tensioning device comprising:
   a housing;
   a piston axially displaceably supported within this housing; and
   a transport securing element, the transport securing element, in at least one transport position of the tensioning device, being situated transversely to the piston and in abutment with the piston in the housing in such a way that a displacement of the piston in at least one first axial direction is blocked,
   the transport securing element including a supporting section, a first web area of the supporting section being in abutment with an end face of the piston in the transport position, and a second web area of the supporting section, the second web area extending axially away from the first web area and axially into a recess of the housing, being supported on the housing at least in a radial direction.

2. The tensioning device as recited in claim 1 wherein the transport securing element has an L-shaped, double L-shaped, S-shaped or Z-shaped cross section, at least in the area of the supporting section, viewed in cross section, the first web area being designed as a first leg of the cross section and the second web area being designed as a second leg of the cross section, or another, third web area of the supporting section being designed as a third leg of the cross section.

3. The tensioning device as recited in claim 1 wherein the transport securing element is designed as a pin-shaped component, or the second web area is longer than the first web area, viewed in the axial direction of the piston.

4. The tensioning device as recited in claim 1 wherein an inner side of the first web area abuts the end face of the piston in the transport position.

5. The tensioning device as recited in claim 4 wherein an outer side of the first web area facing away from the inner side of the first web area abuts a hook-shaped projection of the housing in the transport position.

6. The tensioning device as recited in claim 1 wherein an inner side of the second web area faces an outer shell side of the piston in the transport position.

7. The tensioning device as recited in claim 6 wherein an outer side of the second web area facing away from the inner side of the second web area is supported on the housing in the radial direction in the transport position.

8. The tensioning device as recited in claim 1 wherein the transport securing element is manufactured from a metal material or from a plastic material.

9. The tensioning device as recited in claim 1 wherein the transport securing element is manufactured from a profiled wire.

10. The tensioning device as recited in claim 1 wherein the second web area of the transport securing element is positioned radially between the housing and the piston in the recess of the housing in the transport position.

11. A tensioning device for tensioning a traction mechanism of a traction mechanism drive, the tensioning device comprising:
    a housing;
    a piston axially displaceably supported within this housing; and
    a transport securing element, the transport securing element, in at least one transport position of the tensioning device, being situated transversely to the piston and in abutment with the piston in the housing in such a way that a displacement of the piston in at least one first axial direction is blocked,
    the transport securing element including a supporting section, a first web area of the supporting section being in abutment with an end face of the piston in the transport position, and a second web area of the supporting section, the second web area extending axially from the first web area, being supported on the housing at least in a radial direction, and
    wherein an inner side of the first web area abuts the end face of the piston in the transport position and an outer side of the first web area facing away from the inner side of the first web area abuts a hook-shaped projection of the housing in the transport position.

12. A tensioning device for tensioning a traction mechanism of a traction mechanism drive, the tensioning device comprising:
    a housing;
    a piston axially displaceably supported within this housing; and
    a transport securing element, the transport securing element, in at least one transport position of the tensioning device, being situated transversely to the piston and in abutment with the piston in the housing in such a way that a displacement of the piston in at least one first axial direction is blocked,
    the transport securing element including a supporting section, a first web area of the supporting section being in abutment with an end face of the piston in the transport position, and a second web area of the supporting section, the second web area extending axially from the first web area, being supported on the housing at least in a radial direction, and
    wherein an inner side of the second web area faces an outer shell side of the piston in the transport position and an outer side of the second web area faces away from the inner side of the second web area is supported on the housing in the radial direction in the transport position.

* * * * *